US 6,747,557 B1

(12) United States Patent
Petite et al.

(10) Patent No.: US 6,747,557 B1
(45) Date of Patent: Jun. 8, 2004

(54) SYSTEM AND METHOD FOR SIGNALING A WEATHER ALERT CONDITION TO A RESIDENTIAL ENVIRONMENT

(75) Inventors: Thomas D. Petite, Douglasville, GA (US); Zachary Thomas Petite, Douglasville, GA (US)

(73) Assignee: StatSignal Systems, Inc., Atlanta, GA (US)

( * ) Notice: Subject to any disclaimer, the term of this patent is extended or adjusted under 35 U.S.C. 154(b) by 641 days.

(21) Appl. No.: 09/702,450

(22) Filed: Oct. 31, 2000

Related U.S. Application Data (63) Continuation-in-part of application No. 09/439,059, filed on Nov. 12, 1999, and a continuation-in-part of application No. 09/271,517, filed on Mar. 18, 1999.
(60) Provisional application No. 60/223,932, filed on Aug. 9, 2000, provisional application No. 60/223,923, filed on Aug. 9, 2000, and provisional application No. 60/201,252, filed on May 1, 2000.

(51) Int. Cl.$^7$ ............................................. G08B 21/00
(52) U.S. Cl. ..................... 340/540; 340/628; 340/601; 340/286.05; 340/539.26; 340/7.48
(58) Field of Search .......................... 360/540, 628, 360/630, 631, 632, 521, 522, 601, 286.05, 287, 531, 539.26, 905, 7.48; 379/43, 48

(56) References Cited

U.S. PATENT DOCUMENTS

| | | | |
|---|---|---|---|
| 4,949,077 A | | 8/1990 | Mbuthia .................... 340/628 |
| 5,289,165 A | | 2/1994 | Belin ......................... 340/628 |
| 5,451,929 A | | 9/1995 | Adelman et al. .......... 340/521 |
| 5,628,050 A | * | 5/1997 | McGraw et al. .......... 455/12.1 |
| 5,644,294 A | * | 7/1997 | Ness .......................... 340/540 |
| 5,726,634 A | | 3/1998 | Hess et al. ................. 340/628 |
| 5,889,468 A | | 3/1999 | Banga ........................ 340/628 |
| 5,905,438 A | * | 5/1999 | Weiss et al. ............. 340/636.1 |
| 5,999,094 A | | 12/1999 | Nilssen ...................... 340/507 |
| 6,031,455 A | * | 2/2000 | Grube et al. ............ 340/539.26 |
| 6,075,451 A | * | 6/2000 | Lebowitz et al. ...... 340/539.19 |
| 6,121,885 A | * | 9/2000 | Masone et al. ............ 340/628 |

\* cited by examiner

*Primary Examiner*—Anh V. La
(74) *Attorney, Agent, or Firm*—Thomas, Kayden, Horstemeyer & Risley, LLP (57) ABSTRACT

As system and method are provided for communicating weather conditions to remote locations, such as inside of residential homes, offices, or businesses. In accordance with one embodiment, a modified smoke detector is provided having an integrated RF receiver for receiving message packets containing information that may be conveyed through its speaker, buzzer, or other sound-emanating device. In accordance with another embodiment, a system is provided. The system which may include a mechanism for detecting a weather condition, a wireless transmitter in communication with the mechanism for detecting a weather condition, wherein the wireless transmitter configured to receive a signal from the means for detecting a weather condition and transmit a corresponding signal via electromagnetic waves. The system may also include a receiver remotely located from the wireless transmitter, the receiver configured to receive the electromagnetic signal transmitted from the smoke detector. Finally, the system may include a sound-emanating device, and a sound control mechanism for controlling the sound-emanating device, wherein the sound control mechanism is responsive to the electromagnetic signal received by the receiver. In yet another embodiment, a method is provided. The method includes steps of: (1) determining that a weather condition (e.g., severe weather condition) exists, (2) transmitting a radio frequency (RF) signal containing information about the weather condition, (3) receiving the RF signal with a RF receiver disposed in a smoke detector (or other device), and (4) sounding a buzzer (or other sound emanating device) in response to receiving the RF signal.

24 Claims, 8 Drawing Sheets

SYSTEM AND METHOD FOR SIGNALING A WEATHER ALERT CONDITION TO A RESIDENTIAL ENVIRONMENT

CROSS-REFERENCE TO RELATED APPLICATIONS

This application is a continuation-in-part of U.S. patent applications Ser. No. 09/271,517; filed Mar. 18, 1999, and entitled, "System For Monitoring Conditions in a Residential Living Community," and Ser. No. 09/439,059, filed Nov. 12, 1999, and entitled, "System and Method for Monitoring and Controlling Remote Devices." Each of the identified U.S. patent applications is incorporated herein by reference in its entirety. This application also claims the benefit of U.S. provisional application Serial No. 60/201,252, filed May 1, 2000, and entitled "System and Method for Monitoring and Controlling Remote Devices," U.S. provisional application Ser. No. 60/223,932, filed Aug. 9, 2000, and entitled "Design Specifications for a Smoke Detector Communications Device," and U.S. provisional application Ser. No. 60/223,923, filed Aug. 9, 2000, and entitled "Design Specifications for a Repeater Function." Each of the identified U.S. provisional applications is hereby incorporated by reference in its entirety.

FIELD OF THE INVENTION

The present invention generally relates to weather alert systems, and more particularly to a system and method for signaling a weather alert condition to a residential environment.

BACKGROUND OF THE INVENTION

Various systems exist for alerting people of severe or threatening weather conditions. One such system utilizes geographically-disperse outdoor sirens. When threatening weather conditions exist (or if the conditions are right for threatening weather), a signal is sent to these outdoor sirens in an appropriate geographic region, to sound these sirens. Systems of this type provide an effective alert to people who are in the general vicinity of one of the sirens. However, it has been observed that there are just not enough of these sirens to provide effective coverage. Indeed, depending upon the weather conditions at the time, the sound of these sirens may not travel very far at all. In addition, if nearby residents have closed the doors and windows of their houses, then the sound of the sirens (even if nearby) may not be heard inside. This shortcoming could be at least partially addressed by providing more of these sirens. However, such a measure would be expensive.

Other severe weather-alert prior art systems provide weather alerts by broadcasting signals over television and radio station channels. In these systems, regular radio and television programming may be interrupted in order to relay a weather condition alert. These types of systems, however, are effective only for those having their radios and/or televisions on at the time the weather alert is broadcast. Typically, in the late-night hours (when people are sleeping and their radios and televisions are turned off), these types of systems are not very effective at all.

Accordingly, there is a need and desire to provide an improved solution for alerting severe weather conditions to people in homes, businesses, and other residential environments.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for providing warning of severe or threatening weather that overcomes the shortcomings of the prior art. In accordance with one embodiment of the invention, this warning is provided through the buzzer or alarm unit of a conventional (but modified) smoke detector. Indeed, in accordance with one aspect of the present invention, a modified smoke detector is provided having an integrated RF receiver for receiving message packets containing information that may be conveyed through its speaker, buzzer, or other sound-emanating device.

In accordance with one embodiment of the invention, a system is provided for signaling weather conditions to remote locations, including residential houses. The system may include a mechanism for detecting a weather condition, a wireless transmitter in communication with the mechanism for detecting a weather condition, wherein the wireless transmitter configured to receive a signal from the means for detecting a weather condition and transmit a corresponding signal via electromagnetic waves. The system may also include a receiver remotely located from the wireless transmitter, the receiver configured to receive the electromagnetic signal transmitted from the smoke detector. Finally, the system may include a sound emanating device, and a sound control mechanism for controlling the sound emanating device, wherein the sound control mechanism is responsive to the electromagnetic signal received by the receiver.

In accordance with another aspect or embodiment of the invention, a method is provided for signaling a weather condition to a remote location, including a residential home. The method includes the steps of: (1) determining that a weather condition (e.g., severe weather condition) exists, (2) transmitting a radio frequency (RF) signal containing information about the weather condition, (3) receiving the RF signal with a RF receiver disposed in a smoke detector (or other device), and (4) sounding a buzzer (or other sound emanating device) in response to receiving the RF signal.

In accordance with yet another aspect or embodiment of the invention, a novel smoke detector is provided comprising: a radio frequency (RF) receiver configured to receive an RF signal that is encoded to include information about a weather condition, a sound emanating device, and a sound control mechanism for controlling the output of the sound emanating device in response to the received RF signal.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

DETAILED DESCRIPTION OF THE PREFERRED EMBODIMENTS

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1A:
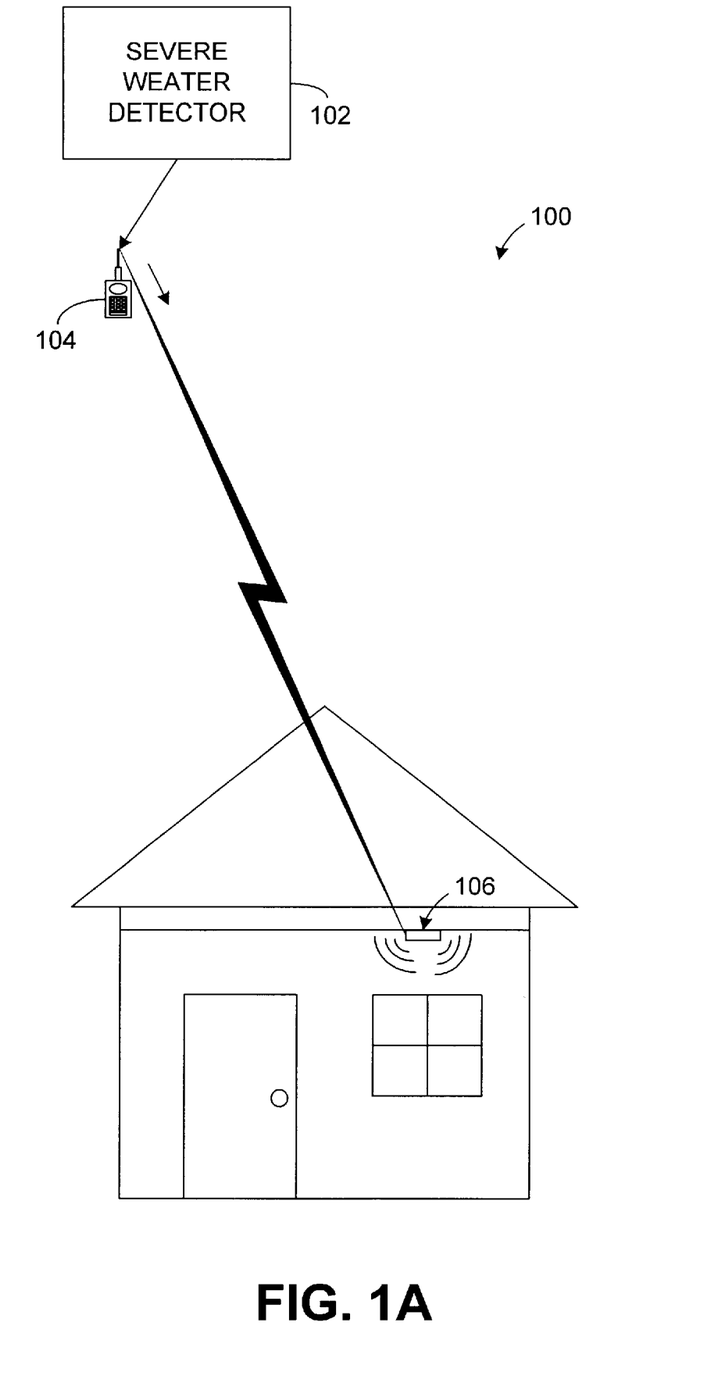
FIG. 1A is a block diagram depicting various components of a weather condition signaling system.

Referring now to the drawings, reference is made to FIG. 1A, which is a block diagram illustrating the principal components of a system 100 constructed in accordance with one embodiment of the present invention. Specifically, in the illustrated embodiment of a FIG. 1A, a severe weather detector 102 communicates with an RF transmitter 104, which in turn communicates with a smoke detector 106 that is preferably disposed in a home, office, or other structure of a residential community.

As summarized above, an embodiment of the present invention relates to a novel system and methods for communicating severe weather conditions to persons in residential areas. In the preferred embodiment, severe weather conditions are communicated to a receiver that is disposed within a smoke detector 106. Additional circuitry, which will be discussed later, may be provided in connection with the smoke detector 106 to sound an audible alarm. Although the receiver and maybe disposed inside other types of devices, it is preferred to incorporate the receiver inside a smoke detector 106, so that the speaker or buzzer built into the smoke detector 106 may be utilized for emitting an audible alarm. In the preferred embodiment, the severe weather alert information is communicated to the smoke detector via some sort of wireless communication. In accordance with another embodiment of the invention, however, hardwired communications may be utilized. However, the preferred embodiment of the present invention utilizes RF communications due to the flexibility that may be obtained when using RF communications. In this regard, the flexibility in location in which the smoke detector 106 may be placed is much greater when utilizing wireless communications, as opposed to hardwired communications.

With reference to the alarm sounded by the smoke detector 106, in accordance with the preferred embodiment of the present invention, the smoke detector 106 includes circuitry (described below) that controls the speaker or buzzer (typically a piezoelectric buzzer) to sound an alarm, tone, or pattern that is unique and distinct from the alarm typically sounded by the smoke detector 106. This way a person hearing the alarm can readily distinguish between an alarm that is signaling a smoke or fire alert and an alarm that is signaling a severe weather condition. In this respect, the circuitry provided in connection with the invention to control the speaker or buzzer of the smoke detector 106 may send an electric signal to the speaker or buzzer that is a different frequency than the electric signal typically sent by the conventional smoke detector alarm circuitry.

Alternatively, the circuitry of the present invention may send bursts of electrical signals to the speaker or buzzer to cause the speaker or buzzer to chirp or pulse an audible alarm, which is readily distinguishable from the audible alarm that is conventionally sounded by the smoke detector 106. Further still, the circuitry of the present invention may control the speaker or buzzer to emit digitized speech. In this regard, the information communicated to the smoke detector may include digitized speech that, when played over a speaker or buzzer, would provide specific instructions to a resident as to the weather condition that the resident is being alerted of. That is, a recorded or digitized voice pattern may instruct a resident that a severe thunderstorm warning is in effect for his or her particular geographic area. Likewise, a recorded or digitized voice pattern may instruct a resident that a tornado watch, tornado warning, flash flood watch or warning, or a variety of other weather conditions are in effect for his or her particular geographic area. As will be appreciated by persons skilled in the art, if a conventional, analog speaker is provided inside the smoke detector 106, then providing an audible alert in the form of digitized speech is a relatively straightforward process (e.g., by simply converting digital data into analog format, amplifying if necessary, and directing the analog signal to the speaker). Alternatively, if the sounding device inside the smoke detector 106 is a piezoelectric buzzer, then digitized speech may be provided by using a technique such as pulse width modulation (PWM) for controlling the signal directed to the buzzer. Although the quality of the digitized speech would be of lower quality, it would nevertheless be understandable, and pulse width modulation techniques of this type are well-known and need not be described herein.

With regard to the severe weather detector 102, it should be appreciated that the present invention is not limited to a particular form of severe weather detector. In this regard, the severe weather detector will typically be a meteorological weather center. However, the severe weather detector 102 may take on a variety of different forms, consistent with the concepts and teachings of the present invention. For example, the severe weather detector 102 maybe in the form of a human being that observes a severe weather condition. Likewise, the severe weather detector 102 maybe a weather vane or wind gauge that simply detects high-speed winds. For example, in such an embodiment, a person may have a weather vane or wind gauge outside of their home that is electrically wired to an RF transmitter. If the weather vane or wind gauge detects high-speed winds, then it may generate a signal that is transmitted by the RF transmitter to a smoke detector in the person's home, which sounds an appropriate alarm. Typically, however, the severe weather detector 102 will be located remotely in the form of a meteorological weather center. Such weather centers are typically equipped with high technology equipment for monitoring and detecting severe weather conditions. When such centers detect severe weather conditions for certain geographic regions, then they may dispatch an appropriate weather alert for the particular geographic region. Further still, the severe weather detector may be a third party organization that monitors weather conditions through communications with or from meteorological centers, weather gauges, or by other means.

It should be appreciated that the manner in which information is communicated from the severe weather detector 102 to the smoke detector 106 may vary greatly, depending upon a number of factors including the distance between the severe weather detector 102 and the smoke detector 106. As illustrated in connection with FIG. 1A, for relatively short distances, information may be communicated from the severe weather detector 102 to the smoke detector 106 by merely hopping the information through a single RF transmitter 104. There are, however, a variety of other manners in which the information may be communicated. In this regard, reference is made to FIG. 1B, which illustrates various forms and media through which information may be communicated from a severe weather detector 102 to a smoke detector 106.

In accordance with the preferred embodiment of the present invention, the smoke detector 106 is identified by a logical IP address. Therefore, information may be routed from the severe weather detector 102 to the smoke detector 106 using routing methodologies that are well-known and used for communicating information over the Internet. Therefore, in one embodiment of present invention, information may be communicated from the severe weather detector 102 to the smoke detector 106 across a wide area network 110, such as the Internet. Again, knowing the destination IP address of the smoke detector 106, routing methodologies that are well-known in connection with Internet communications may be implemented to route the message from the severe weather detector 102 to the smoke detector 106. Therefore, such routing methodologies need not be described herein. It should be appreciated that, as illustrated, the last leg of the communication link to the smoke detector 106 is via RF. In this regard, a gateway (not shown) is provided for directing communications from the wide area network 110 to an RF transmitter 112. Like the smoke detector 106, the RF transmitter 112 may also be identified by a logical IP address. Further, and as should be appreciated, depending upon the distance from the gateway to the smoke detector 106, multiple RF transmitters/transceivers 112 and 114 may be required in order to fully rela the message from the severe weather detector 102 to the smoke detector 106.

Figure 1B:
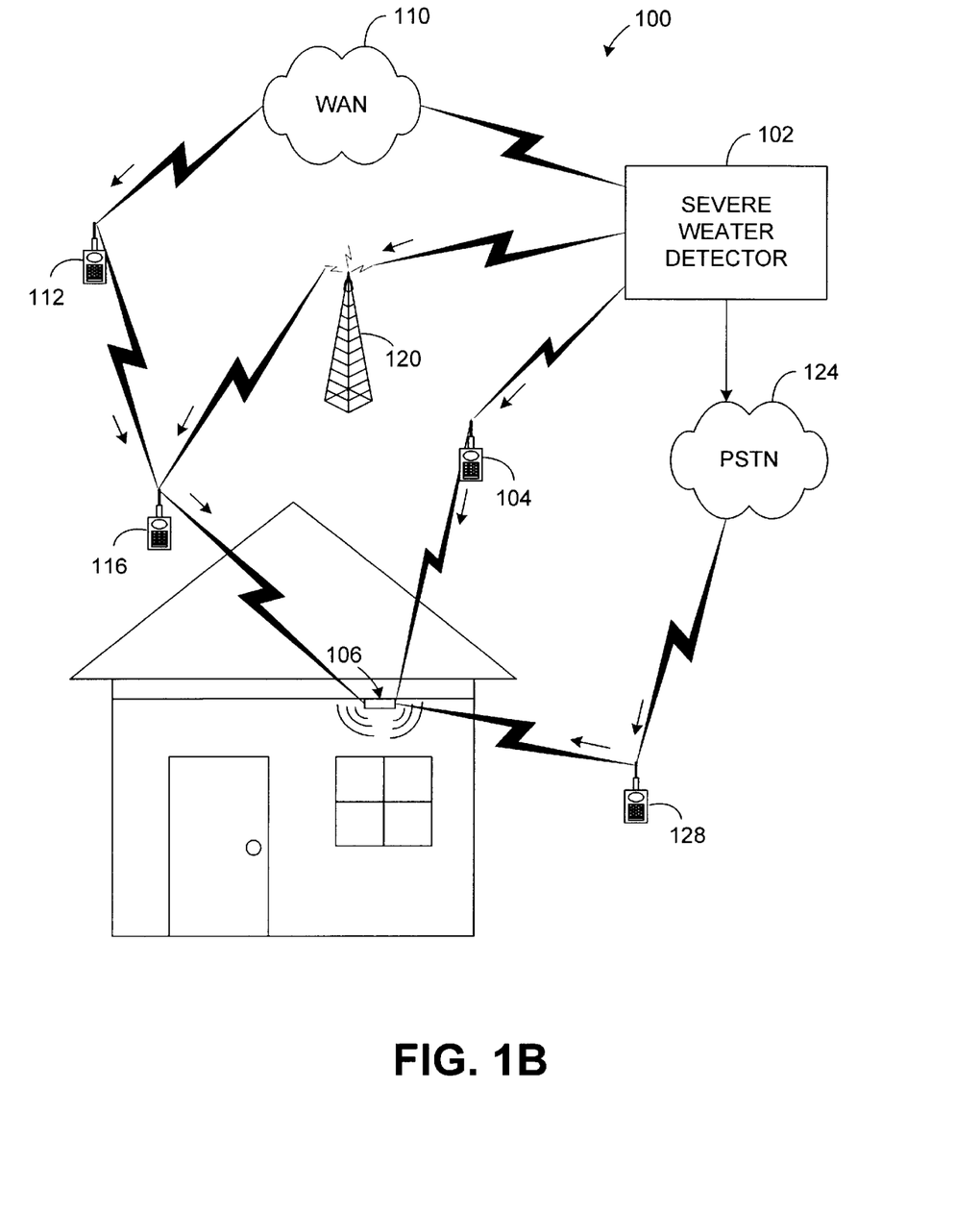
FIG. 1B is a block diagram similar to FIG. 1A, but depicting various additional components of a weather condition signaling system.

Similarly, the communication link between the severe weather detector 102 to the smoke detector 106 may include a cellular link. In this regard, the severe weather detector 102 may communicate through one or more cell towers 120, and ultimately through one or more RF transmitters/transceivers 116 to reach the smoke detector 106. In yet another embodiment, the severe weather detector 102 may communicate with the smoke detector 106 across the PSTN (public switched telephone network) 124. Again, a gateway is preferably provided between the PSTN 124 and a RF transmitter/transceiver 128, which communicates the last leg of the communication to the smoke detector 106.

With regard to the installation, setup, and configuration of a system constructed in accordance with the present invention, a variety of methodologies and techniques may be employed. Such methodologies and/or techniques will not be described herein, as they are not deemed to be limiting upon the scope of the present invention. Further, persons skilled in the art will appreciate how such methodologies and/or techniques may be implemented. By way of example, a person may purchase a smoke detector configured with the circuitry of the present invention and install it, on his own, in his home, office, or business. Once the smoke detector is deployed, a transmitter therein may be provided, whereby the person may simply depress a button that causes an outgoing message to be transmitted. This outgoing message may include a unique identification number (that is or is associated with the IP address for the smoke detector). This transmitted message may be detected by a nearby RF transmitter/transceiver that then relays this new IP address on (ultimately to a database containing addresses of other smoke detectors and/or RF transmitters). Assuming that the geographic region associated with the RF transmitter/transceiver that first detects the identification number transmitted by the smoke detector is known, then the general geographic region of the newly installed smoke detector is generally known as well. In essence, new smoke detectors carrying the circuitry of the present invention may be installed and become identifiable to the outside world in much the same way that new computers, networks, Web sites, and other items bearing IP addresses become deployed and known to the outside world.

With regard to the general operation of the system 100, a severe weather detector 102 may detect a severe weather condition for a particular geographic region. A computer associated with a severe weather detector may utilize a lookup table to identify the various IP addresses that are located in the general geographic region. Discrete messages may be mass broadcast, destined for each of the IP addresses that are identified by the lookup table. As described above, in accordance with one embodiment of the present invention each smoke detector 106 constructed in accordance with the invention may be identified by logical IP address. Alternatively, smoke detectors 106 need not be separately addressable. Instead, the severe weather detector 102 may simply use a lookup table (or other device or methodology) to identify addresses (e.g., logical IP addresses) for the various gateways or RF transmitters/transceivers of a particular geographic region. The weather alert messages from the severe weather detector 102 may then be broadcast to each of these logical IP addresses. The transmitters/transceivers that receive these messages may simply broadcast (i.e., transmit) the message via RF to only the geographic region that immediately surrounds the RF transmitter (i.e., the geographic region within the transmission range of the RF transmitter). Alternatively, each of the RF transmitters that are identified by the destination IP address of the message broadcast from the severe weather detector 102 may broadcast the message in such a way that it will be read broadcast by repeater RF transmitters for a predetermined number of hops. In such a configuration, the "time to live" field (or some similar mechanism) that is known in the IP protocol may be utilized. That is, when the message is broadcast from the destination RF transmitter, the value in the time to live field (or other mechanism) may be set to a predetermined number so that the message is broadcast and repeated for a predetermined number of RF transmission hops. Such a methodology may be suitable for effective coverage at a given geographic region.

Again, the methodologies for installation setup, as well as the methodologies for communicating information from a severe weather detector 102 to the smoke detector 106, that have been described immediately above are not deemed to be limiting upon the present invention. Instead, these methodologies have been presented merely for purposes of illustration and it will be appreciated that a variety of other techniques and methodologies may be implemented in accordance with the concepts and teachings of the present invention. Further, other techniques and methodologies will be appreciated and understood by person's skill in the art, and therefore need not be described herein.

Figure 1C:
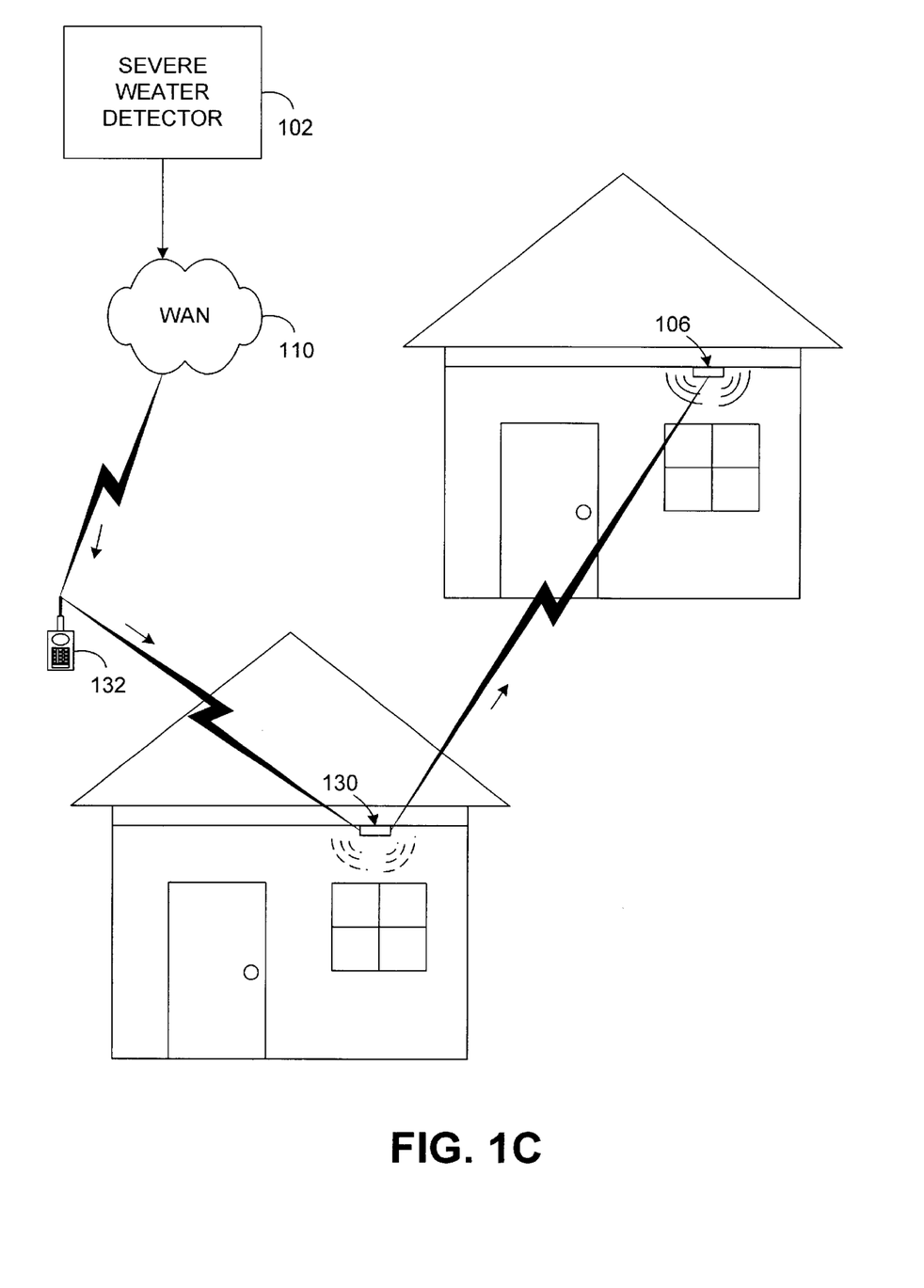
FIG. 1C is a block diagram similar to FIG. 1A, but depicting various additional components of a weather condition signaling system.

Reference is now made briefly to FIG. 1C, which illustrates yet another communication path of the message from the severe weather detector 102 to the smoke detector 106. As illustrated in FIG. 1B, the message may be communicated across a variety of channels, including a wide area network 110. It should be appreciated that in accordance with one embodiment of the present invention, the smoke detectors 106 and 130 may include RF transceivers, so that the smoke detectors themselves may be used to hop a message along. In the embodiment illustrated in FIG. 1C, a message is communicated from a severe weather detector 102 across a WAN 110 through a gateway (not shown), through an RF transceiver 132, through a RF transceiver of a smoke detector 130, and ultimately to the destination smoke detector 106. It will be appreciated that in most instances both of the smoke detectors 130 and 106 will be controlled to sound the severe weather alert. It should be appreciated, however, that in certain circumstances a particular message may be destined for a particular smoke detector (i.e. smoke detector 106). In such a circumstance, smoke detector 130 would not sound the audible alarm, but rather would operate merely to relay the message ultimately destined for smoke detector 106.

Having described various features of the system illustrated in FIGS. 1A, 1B, and 1C, reference will now be made in more detail to the circuitry within the smoke detector 106. In this regard, reference is made FIG. 2A, which is a block diagram illustrating certain functional components that may be provided within a smoke detector 106 constructed in accordance with one embodiment of the present invention. As with conventional smoke detectors, a speaker or buzzer 202 is provided for sounding an audible alarm. In addition, conventional smoke detector circuitry 204 is provided for detecting smoke or other appropriate alarm conditions. In addition to these conventional components, additional components are provided in accordance with various aspects of certain embodiments of the present invention.

Figure 2A:
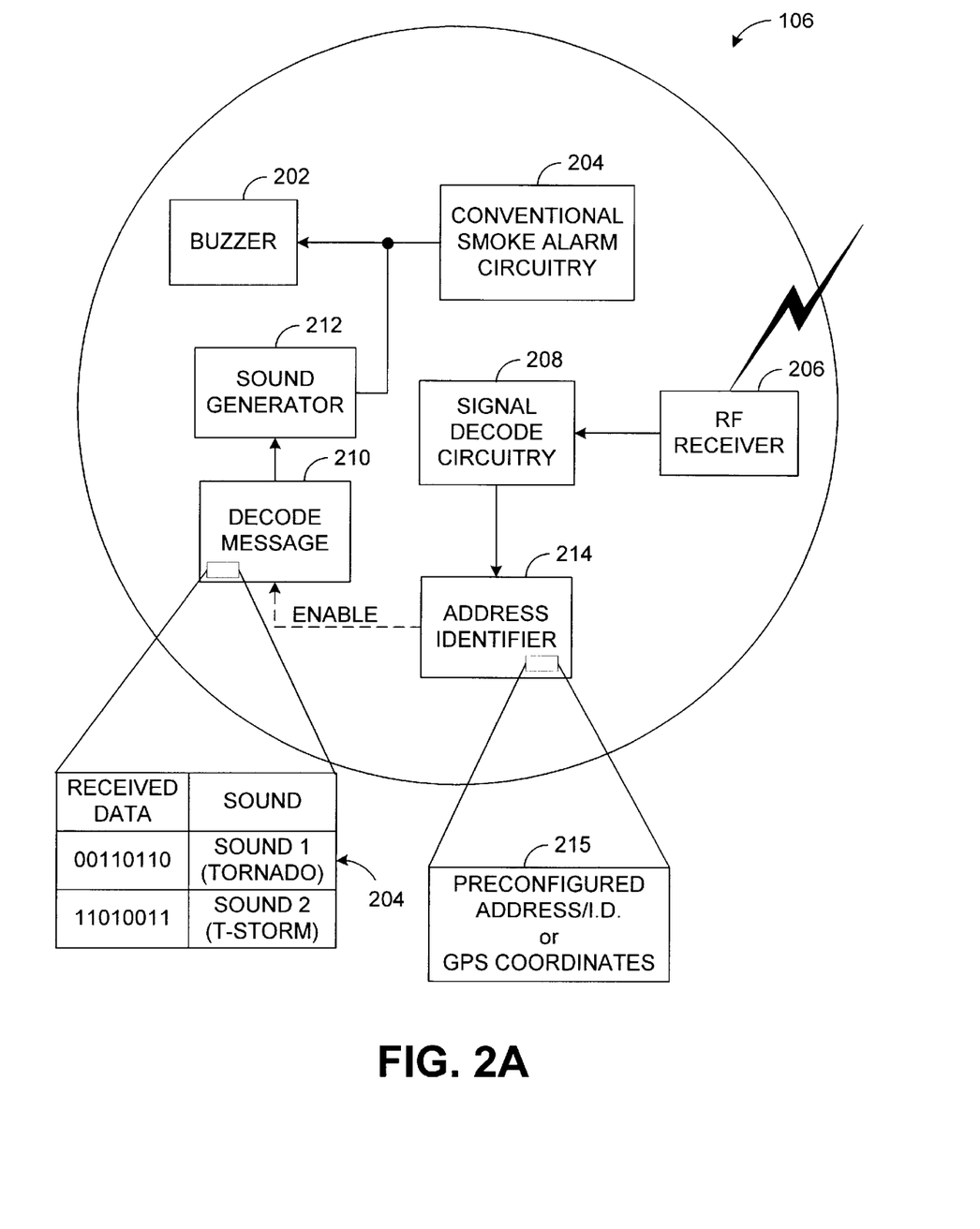
FIG. 2A is a diagram illustrating various functional blocks that may be operational within a smoke detector constructed in accordance with one embodiment of the present invention.

For example, a RF receiver 206 is provided for receiving the RF signal transmitted by a nearby RF transmitter. Signal decode circuitry 208 may be provided for receiving an analog signal output from the RF receiver 206, digitizing, and decoding the signal into identifiable bytes of digital data, which then may be processed and analyzed. In this regard, circuitry 210 may be provided for decoding a message that is contained within the signal received by the RF receiver 206. It will be appreciated that the signal received by the RF receiver 206 may comprise data in addition to simply the message (i.e., the severe weather alert) communicated by the severe weather detector 102. For example, address data and other information may be provided in the information received by the RF receiver 206. In this respect, the circuitry 210 provided for decoding the message may include a lookup table 211 to perform the actual decoding. It should be appreciated that the substance of the message may entail no more than a single data byte of information. This single byte of information may be encoded to provide informative information. For example, in a single eight-bit byte of data, up to 256 distinct messages may be encoded and conveyed. FIG. 2A illustrates only two such distinct messages. In the embodiment illustrated in FIG. 2A, one distinct data byte may be encoded to indicate a tornado watch. Another distinct data byte may indicate a severe thunderstorm warning. A variety of other conditions or messages may be encoded and contained within the data byte. Indeed, in another embodiment (alluded to above) the message communicated from the severe weather detector may include digitized speech to be played over the speaker or buzzer 202 of the smoke detector 106. In such an embodiment, many multiple message packets may be received at the smoke detector 106, wherein the byte(s) containing the actual message content may be decoded from successive message packets to collectively comprise the digitized speech. In such an embodiment, if digitized speech is to be played over the buzzer 202 in real-time, then successive message packets should be received by the smoke detector 106 in sufficient frequency. Otherwise, message packets may be received and stored until the entire message has been placed in memory, where it can be retrieved and played over the buzzer 202.

Ultimately, the decoded message may be directed to sound generation circuitry 212, which outputs an electrical signal to control the buzzer 202. In the preferred embodiment, the manner in which the buzzer 202 will be controlled will depend upon the message received and decoded. Preferably, the buzzer 202 will be controlled in a manner such that it emits a distinct sound from that made by detection of the smoke condition the conventional smoke detector circuitry 204. In this regard, the conventional smoke detector circuitry 204 typically controls the buzzer 202 to emit a particular tone or frequency signal. The tones or frequencies emitted by the buzzer, as controlled by the sound generation circuitry 212, will preferably be unique and distinct. Indeed, in a preferred embodiment each separate weather alert condition that is detectable by the decode circuitry will preferably cause the buzzer 202 (as controlled by the sound generation circuitry 212) to emit a distinct sound. Therefore, one frequency, tone, or pattern of sound may be emitted from the buzzer in response to the event detection of a tornado watch condition, while a second frequency, tone, or pattern of sound may be emitted from the buzzer 202 in response to the event detection of the thunderstorm warning.

Also illustrated in FIG. 2A is a functional block denoted as "Address Identifier" 214. In an embodiment where individual smoke detectors are identified by a logical IP addresses, or some other addressing mechanism, address identifier circuitry 214 may be provided to identify and/or verify that the smoke detector 106 is the intended destination for the message. In this regard, the address identifier circuitry 214 may include relatively simple comparator logic to compare a destination address contained within the message packets with a predetermined or preconfigured address for the smoke detector 106. Simply stated, if the destination address received within the message packet(s) matches the predetermined or preconfigured address of the smoke detector 106, then the decode circuitry 210 and sound generation circuitry 212 may be utilized in accordance with the invention. If, however, the destination address received within the message packet(s) does not match the preconfigured address of the smoke detector 106, then the decode circuitry 210 and sound generation circuitry 212 need not operate on the current message. In the embodiment illustrated in FIG. 2A, the address identifier circuitry is illustrated as having an "enable" output that may control the operation of the decode circuitry 210. Of course, the broad function described above (namely the use of the address identifier circuitry 214 to enable or disable the operation of the decode circuitry 210 and sound generation circuitry 212) may be implemented in a variety of ways. For example, the address identifier circuitry may simply control a relay that opens a switch to connect or disconnect the signal line leading to the buzzer 202. In such an embodiment, the sound generation circuitry 212 and decode circuitry 210 may continue to work as normal. However, the output from the sound generation circuitry would not be permitted to reach the buzzer 202, unless the smoke detector 106 was the intended destination for the message.

In another embodiment global positioning system (GPS) coordinate information may be used to specify the geographic region(s) covered by the weather condition(s). In such an embodiment, the address identifier circuitry 214 may compare GPS coordinate information that may be conveyed within the message, in comparison to the GPS coordinates 215 of the deployed smoke detector. Of course, in such an embodiment, the smoke detector 106 may include a built-in GPS receiver for ascertaining the GPS coordinates of the smoke detector 106. Alternatively, those coordinates could be programmed or otherwise installed into the smoke detector 106 upon installation and deployment. Therefore, when a message is received by the RF receiver 206, the address identifier circuitry 214 may compare GPS coordinates (preferable expressed to define a geographic area, as opposed to a single point coordinate) contained within the message with those pre-configured or sensed within the smoke detector 106, to determine whether the smoke detector 106 is within the geographic area for the alert condition. This determination may be used appropriately to control the operation of the decode circuitry.

It will be appreciated that numerous embodiments for the smoke detector 106 may be implemented in accordance with the broad concepts and teachings of the present invention. In this regard, reference is made to FIG. 2B, which shows an embodiment similar to FIG. 2A, but having a second buzzer or speaker 220. In this embodiment, all other circuit components may be structured as described in connection with FIG. 2A. In such an embodiment, the circuitry of the invention simply controls a separate buzzer or speaker 220. As illustrated, this allows the circuitry of the present invention to be completely distinct and separate from the conventional smoke detector circuitry. In such an embodiment, it will be appreciated that the circuitry of the present invention may be provided in any device, and thus need not be associated with a smoke detector at all. Therefore, separate physical units may be purchased and deployed in households that contain the circuitry of the present invention, and does not need not be specifically tied to smoke detector circuitry.

Figure 2B:
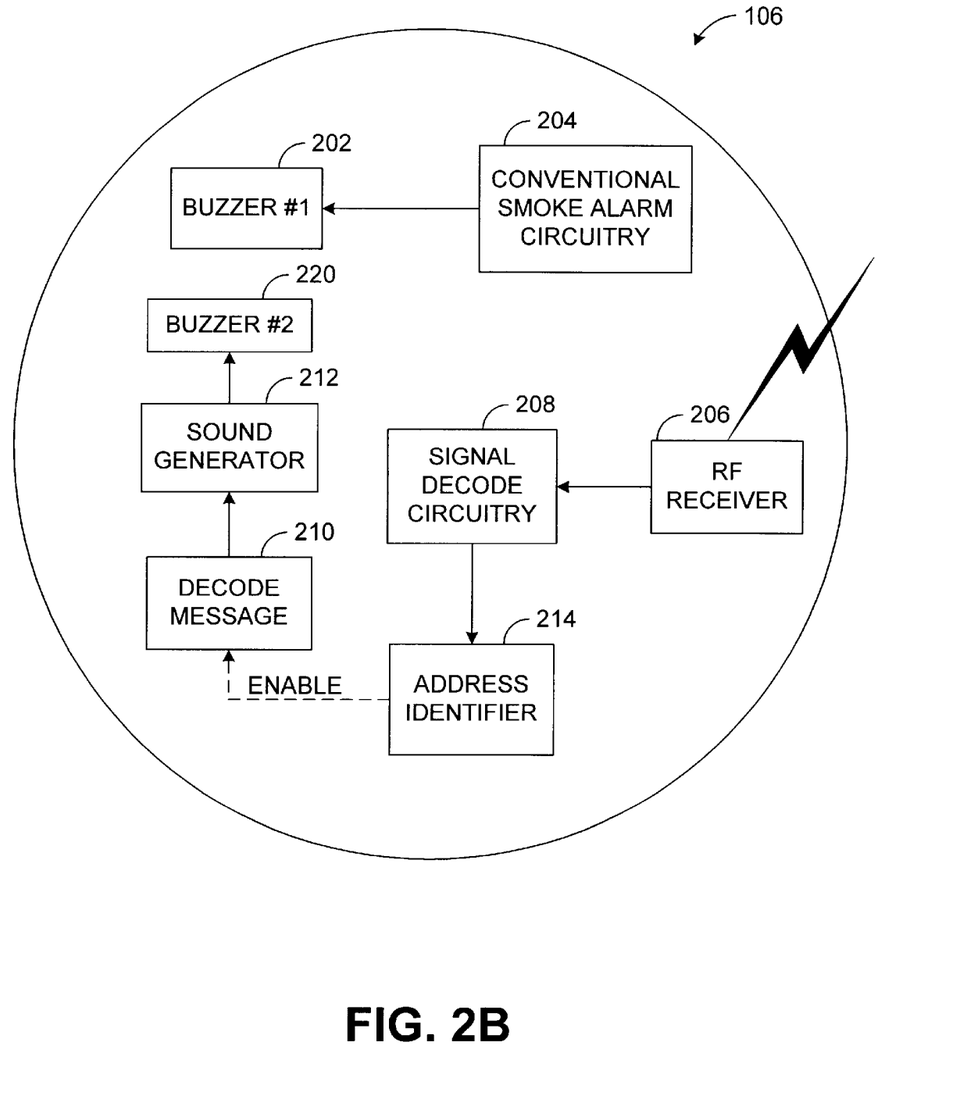
FIG. 2B is a diagram similar to FIG. 2A, illustrating various functional blocks that may be operational within a smoke detector constructed in accordance with another embodiment of the present invention.
Figure 2C:
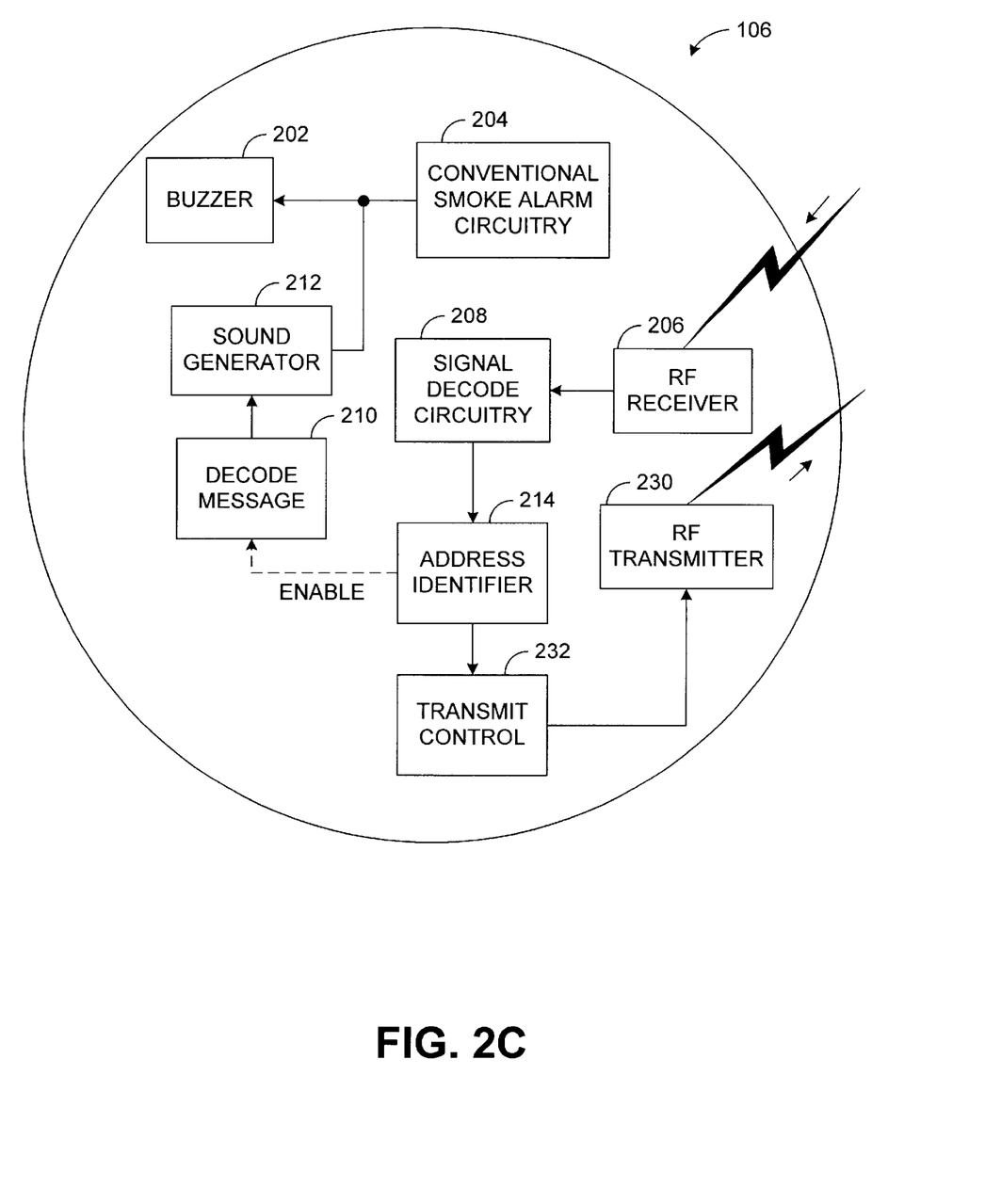
FIG. 2C is a diagram similar to FIG. 2A, illustrating various functional blocks that may be operational within a smoke detector constructed in accordance with another embodiment of the present invention.

FIG. 2C illustrates yet another embodiment similar to the embodiment of FIG. 2A, but including an RF transmitter 230. As specifically described in connection with FIG. 1C, it was noted that smoke detectors 106 may include built-in transmitters so that the smoke detectors themselves may be used to hop (i.e., relay) messages along. In such embodiments, the smoke detector 106 may include an RF transmitter 230 that is configured and controlled to transmit a message. It will be appreciated, however, that the RF receiver 206 and RF transmitter 230 may be embodied in a single RF transceiver, and the embodiments should be treated as equivalents. In such an embodiment, transmit control circuitry 232 may also be provided to control the transmission of messages from the RF transmitter 230. The particular implementation details with regard to how and why messages may be transmitted from a smoke detector 106 are within the level of skill of one having ordinary skill in the art and are not intended to be limiting upon the scope of the present invention. Therefore, such details need not be described herein.

Figure 2D:
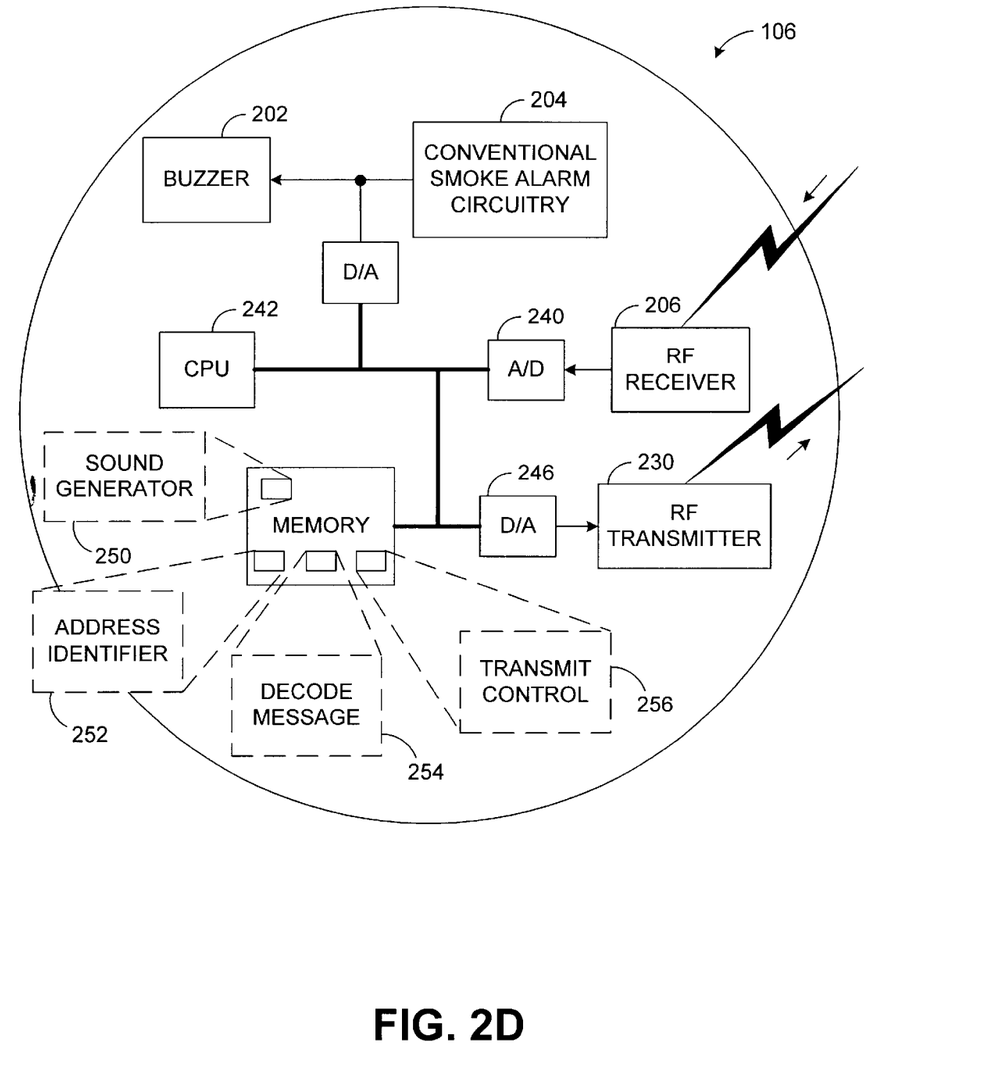
FIG. 2D is a diagram illustrating both physical and functional blocks that may be operational within a smoke detector constructed in accordance with an embodiment of the present invention.

The diagrams of FIGS. 2A, 2B, and 2C are intended to convey functional blocks diagrams of certain circuit components that may be implemented within a smoke detector constructed in accordance with the present invention. It should be appreciated that the functional blocks of those figures do not necessarily correspond to physical circuit components. Although the functional blocks illustrated in those figures may, in fact, correspond to physical circuit components, the circuitry implemented in the embodiments of those figures may be implemented in general-purpose circuitry, such as a microprocessor under software control. Such an embodiment may take the form of that illustrated in FIG. 2D. As illustrated, such an embodiment may include the buzzer 202 and smoke detector circuitry 204 that are conventionally included in smoke detectors. An analog to digital converter 240 may be provided at the output of the RF receiver 206 to digitize the analog signal output therefrom. The digital signal may then be read by a microprocessor or CPU 242 and/or stored in memory 244. Likewise, a digital analog converter 246 may receive information from the CPU 242 or memory 244 for output to the RF transmitter 230. The various functional aspects described in connection with FIGS. 2A, 2B, and 2C may be implemented in software. Thus, various code segments may be stored within memory 244 to control the operation of the CPU 242 to carry out various functional tasks. In this regard, a first segment 250 may be provided to control the CPU 242 for performing or carrying out the sound generation control. A second code segment 252 may be provided for controlling or carrying out the identification of the destination address received in the message packets (i.e., determining whether the current smoke detector 106 is the intended destination for the message). A third code segment 254 may be provided for decoding the actual message received by the RF receiver 206. A fourth code segment 256 may be provided for controlling the data generated and sent to the RF transmitter 230 for transmission. Lookup tables and additional functional blocks, not shown in FIG. 2D, may also be provided within memory 244.

It should be appreciated that the various smoke detector embodiments illustrated herein have been illustrated merely for purposes of depicting certain features or aspects of the present invention. With the discussion herein, it should be appreciated that a variety of other implementations or embodiments may be developed or implemented consistent with the scope and spirit of the present invention. In this regard, the embodiments described herein should be treated as illustrative, as opposed to limiting upon the scope of the present invention.

Various implementation details have not been described herein, because they are within the understanding and knowledge of persons having ordinary skill in the art, and because they are not deemed to be limiting upon the broad scope of the present invention. For example, consistent with the scope and spirit of the present invention, the particular manner in which messages are routed from the severe weather detector 102 and smoke detectors 106 may be implemented in a variety of ways. Likewise, the actual content of the messages and the message packets that are used to relay weather condition information from the severe weather detector 102 to smoke detectors 106 may vary, consistent with the present invention. In one embodiment, the message format may be the same (or similar to) that described in co-pending application Ser. No. 09/439,059, filed Nov. 12, 1999, the contents of which were incorporated herein by reference above.

Figure 3:
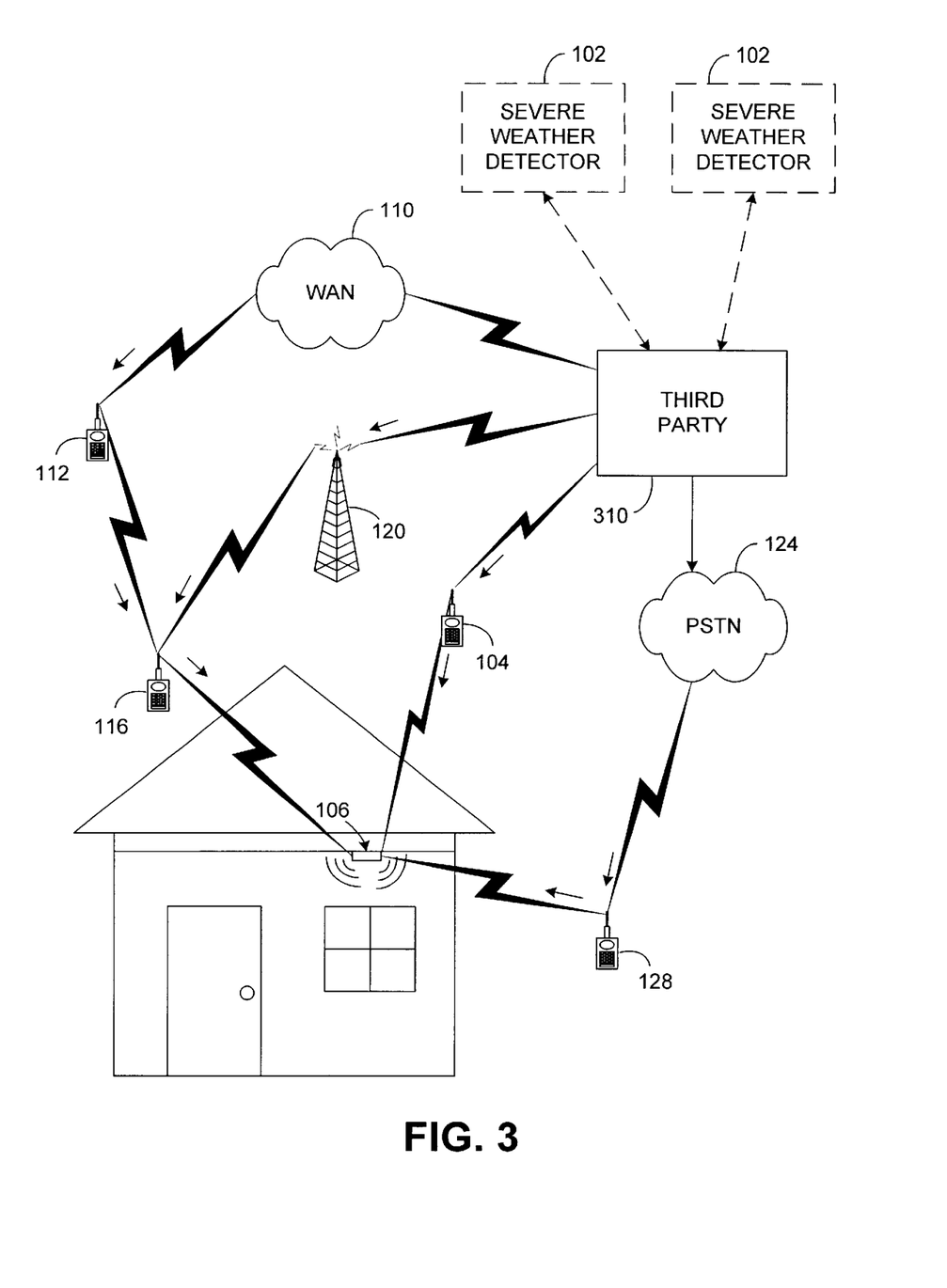
FIG. 3 is a block diagram similar to FIG. 1B, but depicting an alternative embodiment of the invention, including a third party for monitoring weather conditions and alerting customers or subscribers accordingly.

A method was described briefly above, in which an individual may purchase a smoke detector and install it in his or her home. In accordance with another embodiment or aspect of the invention, a smoke detector (or other alarming device) may be provided and controlled by a third party. Although, as mentioned above, a severe weather detector may take on the form of a third party, one implementation of such an embodiment is specifically illustrated in FIG. 3. As illustrated, the embodiment of FIG. 3 is similar to the embodiment depicted in FIG. 1B, except that a third party 310 interfaces or communicates with one or more severe weather detectors 102. In such an embodiment, a third party 310 particularly monitors weather conditions through one or more severe weather detectors 102 and communicates appropriate warnings or alerts to its customers or subscribers.

Thus, in such an embodiment, the third party 310 may supply customers or subscribers with appropriate equipment (e.g., smoke detector) for receiving messages from conveying weather condition information. Likewise, the third party may configure and install the various devices. Thus, such an embodiment may comprise a novel business method, whereby a third party monitors weather conditions and communicates certain weather conditions to its customers or subscribers through at least one leg or hop comprising RF communications.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A severe weather alert system comprising:
   a severe weather detector configured to detect a severe weather condition;
   a radio frequency (RF) transmitter in communication with the severe weather detector, the RF transmitter configured to transmit a signal in response to a signal received from the severe weather detector via RF electromagnetic waves;
   a smoke detector having an RF receiver configured to receive the RF signal transmitted from the RF transmitter, the smoke detector further including circuitry to control a sound emanating device to emit a unique sound to indicate a severe weather condition;
   discriminator circuitry configured to determine whether the received RF signal is destined for the smoke detector; and
   an RF transmitter within the smoke detector, wherein the RF transmitter of the smoke detector is configured to relay the received RF signal if the discriminator circuitry determines that the received RF signal is not destined for the smoke detector.

2. The severe weather alert system of claim 1, wherein the severe weather detector is a meteorological weather center.

3. The severe weather alert system of claim 1, wherein the severe weather detector is a human.

4. The severe weather alert system of claim 1, wherein the severe weather detector is a weather gauge.

5. The severe weather alert system of claim 1, wherein the RF transmitter is in communication with the severe weather detector via a public switched telephone network (PSTN).

6. The severe weather alert system of claim 1, wherein the RF transmitter is in communication with the severe weather detector via a wide area computer network.

7. The severe weather alert system of claim 1, wherein the RF transmitter is in communication with the severe weather detector via a cellular link.

8. The severe weather alert system of claim 1, wherein the RF transmitter is in communication with the severe weather detector via a RF link.

9. The severe weather alert system of claim 1, wherein the smoke detector further includes a sound control mechanism configured to control the sound emitted from the sound emanating device.

10. The severe weather alert system of claim 9, wherein the sound control mechanism is configured to control the sound emanating device to emit a sound that is distinct from the sound emitted from the smoke detector when signaling a smoke detector.

11. The severe weather alert system of claim 9, further including a second sound emanating device, wherein the second sound emanating device is controlled by conventional smoke detector circuitry.

12. The severe weather alert system of claim 1, wherein the sound emanating device is a piezoelectric buzzer.

13. A method for signaling a severe weather condition comprising the steps of:
    determining that a severe weather condition exists;
    transmitting a radio frequency (RF) signal containing information about the severe weather condition;
    receiving the RF signal with a RF receiver disposed in a smoke detector;
    determining whether the smoke detector is a destination detector for the RF signal; and
    sounding a buzzer of the smoke detector in response to receiving the RF signal, if it is determined that the smoke detector is a destination detector for the RF signal; and
    relaying the received RF signal to another smoke detector, if it is determined that the smoke detector is not a destination detector for the RF signal.

14. The method of claim 13, further including the step of communicating a signal indicative of a severe weather condition to the RF transmitter.

15. The method of claim 14, wherein the step of communicating a signal includes communicating the signal across a public switched telephone network (PSTN).

16. The method of claim 14, wherein the step of communicating a signal includes communicating the signal across a cellular link.

17. The method of claim 14, wherein the step of communicating a signal includes communicating the signal across a wide area computer network.

18. The method of claim 13, wherein the step of sounding the buzzer sounds the buzzer to emit a sound different than the buzzer emits when sounding a smoke detector.

19. The method of claim 13, wherein the step of determining that a severe weather condition exists includes forecasting a severe weather condition.

20. A method for signaling a weather condition comprising the steps of:
- determining that a weather condition exists;
- transmitting a radio frequency (RF) signal containing information about the weather condition;
- receiving the RF signal with a RF receiver disposed in a smoke detector;
- determining whether the smoke detector is a destination detector for the RF signal; and
- causing a device to emit an audible sound in response to receiving the RF signal, if it is determined that the smoke detector is a destination detector for the RF signal; and
- relaying the received RF signal to another smoke detector, if it is determined that the smoke detector is not a destination detector for the RF signal.

21. A system for signaling a weather condition comprising:
- means for detecting a weather condition;
- a wireless transmitter in communication with the means for detecting a weather condition, the wireless transmitter configured to transmit a signal in response to a detected weather condition via electromagnetic waves;
- a receiver remotely located from the wireless transmitter, the receiver configured to receive the electromagnetic signal transmitted from the wireless transmitter;
- a sound emanating device;
- discriminator circuitry configured to determine whether the received wireless signal is destined for the receiver;
- an RF transmitter coupled to the receiver, wherein the RF transmitter is configured to relay the received signal if the discriminator circuitry determines that the received wireless signal is not destined for the receiver; and
- sound control means for controlling the sound emanating device, the sound control means being responsive to the electromagnetic signal received by the receiver, if the discriminator circuitry determines that the received wireless signal is destined for the receiver.

22. The system of claim 21, wherein the receiver is disposed inside a smoke detector.

23. The system of claim 21, wherein the sound control means includes circuitry configured to output a signal that is input to the sound emanating device.

24. The system of claim 21, wherein the wireless transmitter is an RF transmitter.

* * * * *